US011769463B1

(12) United States Patent
Wu et al.

(10) Patent No.: US 11,769,463 B1
(45) Date of Patent: Sep. 26, 2023

(54) VIDEO STREAMING TRANSMISSION SYSTEM AND TRANSMITTER DEVICE

(71) Applicant: BENQ CORPORATION, Taipei (TW)

(72) Inventors: Chen-Chi Wu, Taipei (TW); Chun-Han Lin, Taipei (TW); Chia-Nan Shih, Taipei (TW); Chin-Fu Chiang, Taipei (TW); Jung-Kun Tseng, Taipei (TW); Chuang-Wei Wu, Taipei (TW)

(73) Assignee: BENQ CORPORATION, Taipei (TW)

( * ) Notice: Subject to any disclaimer, the term of this patent is extended or adjusted under 35 U.S.C. 154(b) by 0 days.

(21) Appl. No.: 17/903,065

(22) Filed: Sep. 6, 2022

(30) Foreign Application Priority Data

May 18, 2022 (TW) .................................. 111118518

(51) Int. Cl.
*G09G 5/00* (2006.01)
(52) U.S. Cl.
CPC ......... *G09G 5/003* (2013.01); *G09G 2370/04* (2013.01); *G09G 2370/042* (2013.01); *G09G 2370/16* (2013.01)
(58) Field of Classification Search
CPC .............. G09G 5/003; G09G 2370/04; G09G 2370/042; G09G 2370/16
See application file for complete search history.

(56) References Cited

U.S. PATENT DOCUMENTS

2009/0322948 A1* 12/2009 Funabiki .......... H04N 21/43637
348/E5.062

2013/0335300 A1* 12/2013 Tajima ................. G06F 3/1454
345/2.3
2020/0302894 A1* 9/2020 Khen ........................ G09G 5/14

FOREIGN PATENT DOCUMENTS

TW 202046706 12/2020
TW 202218404 5/2022

OTHER PUBLICATIONS

"Office Action of Taiwan Counterpart Application", dated Mar. 6, 2023, p. 1-p. 9.

* cited by examiner

*Primary Examiner* — Brent D Castiaux
(74) *Attorney, Agent, or Firm* — JCIPRNET

(57) ABSTRACT

A video streaming transmission system and a transmitter device are provided. The video streaming transmission system includes a receiver device and a transmitter device. The receiver device is coupled to a display module. The transmitter device is coupled to an image providing device through a transmission line. The transmitter device includes a processing unit, a storage unit, and a wireless communication module. The storage unit is coupled to the processing unit. The wireless communication module is coupled to the processing unit, and is coupled to the receiver device in a wireless communication manner. The processing unit generates virtual extended display identification data and stores them in the storage unit, and provides the virtual extended display identification data to the image providing device through the transmission line, so that the image providing device recognizes multiple virtual displays coupled thereto, and outputs multiple video streams through the transmission line.

20 Claims, 7 Drawing Sheets

VIDEO STREAMING TRANSMISSION SYSTEM AND TRANSMITTER DEVICE

CROSS-REFERENCE TO RELATED APPLICATION

This application claims the priority benefit of Taiwan application serial no. 111118518, filed on May 18, 2022. The entirety of the above-mentioned patent application is hereby incorporated by reference herein and made a part of this specification.

BACKGROUND

Technical Field

The disclosure relates to a video streaming transmission system, and more particularly, to a video streaming transmission system and a transmitter device.

Description of Related Art

The conventional display application of multiple extended frames is that multiple displays are coupled to an image providing device through multiple transmission lines or multiple transmitter devices, so that the image providing device may obtain multiple extended display identification data (EDID) corresponding to the displays through the transmission lines or the transmitter devices. The image providing device may output multiple video streams corresponding to the extended frames to the displays according to the extended display identification data, so that the displays respectively display the extended frames. In other words, the conventional display application of the extended frames is implemented through complex coupling configurations of the transmission lines or the transmitter devices. In addition, in some specific display scenarios, such as screen sharing scenarios in conferences, it is impossible to present content of the extended frames in conferences by displaying multiple divided frames on the same display in the conventional display application of the extended frames, which limits the presentation of the conventional screen sharing scenarios in the conferences.

SUMMARY

The disclosure provides a video streaming transmission system and a transmitter device, which may enable an image providing device to output a plurality of video streams, so that a display module may display a plurality of divided frames according to the video streams.

A video streaming transmission system in the disclosure is suitable for a display module and an image providing device. The video streaming transmission system includes a receiver device and a transmitter device. The receiver device is coupled to the display module. The transmitter device is coupled to the image providing device through a transmission line. The transmitter device includes a processing unit, a storage unit, and a wireless communication module. The storage unit is coupled to the processing unit. The wireless communication module is coupled to the processing unit, and is coupled to the receiver device in a wireless communication manner. The processing unit generates a plurality of virtual extended display identification data and stores the virtual extended display identification data in the storage unit, and provides the virtual extended display identification data to the image providing device through the transmission line, so that the image providing device recognizes a plurality of virtual displays coupled thereto, and outputs a plurality of video streams through the transmission line.

A transmitter device in the disclosure is suitable for being coupled to an image providing device and a receiver device. The receiver device is further coupled to a display module. The transmitter device includes a processing unit, a storage unit, and a wireless communication module. The processing unit is coupled to the image providing device through a transmission line. The storage unit is coupled to the processing unit. The wireless communication module is coupled to the processing unit, and is coupled to the receiver device in a wireless communication manner. The processing unit generates a plurality of virtual extended display identification data and stores the virtual extended display identification data in the storage unit, and provides the virtual extended display identification data to the image providing device through the transmission line, so that the image providing device recognizes a plurality of virtual displays coupled thereto, and outputs a plurality of video streams through the transmission line.

Based on the above, the video streaming transmission system and the transmitter device in the disclosure may provide the virtual extended display identification data to the image providing device, so that the image providing device may recognize the virtual displays coupled thereto according to the extended display identification data, and a user may choose to generate one or more video streams.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
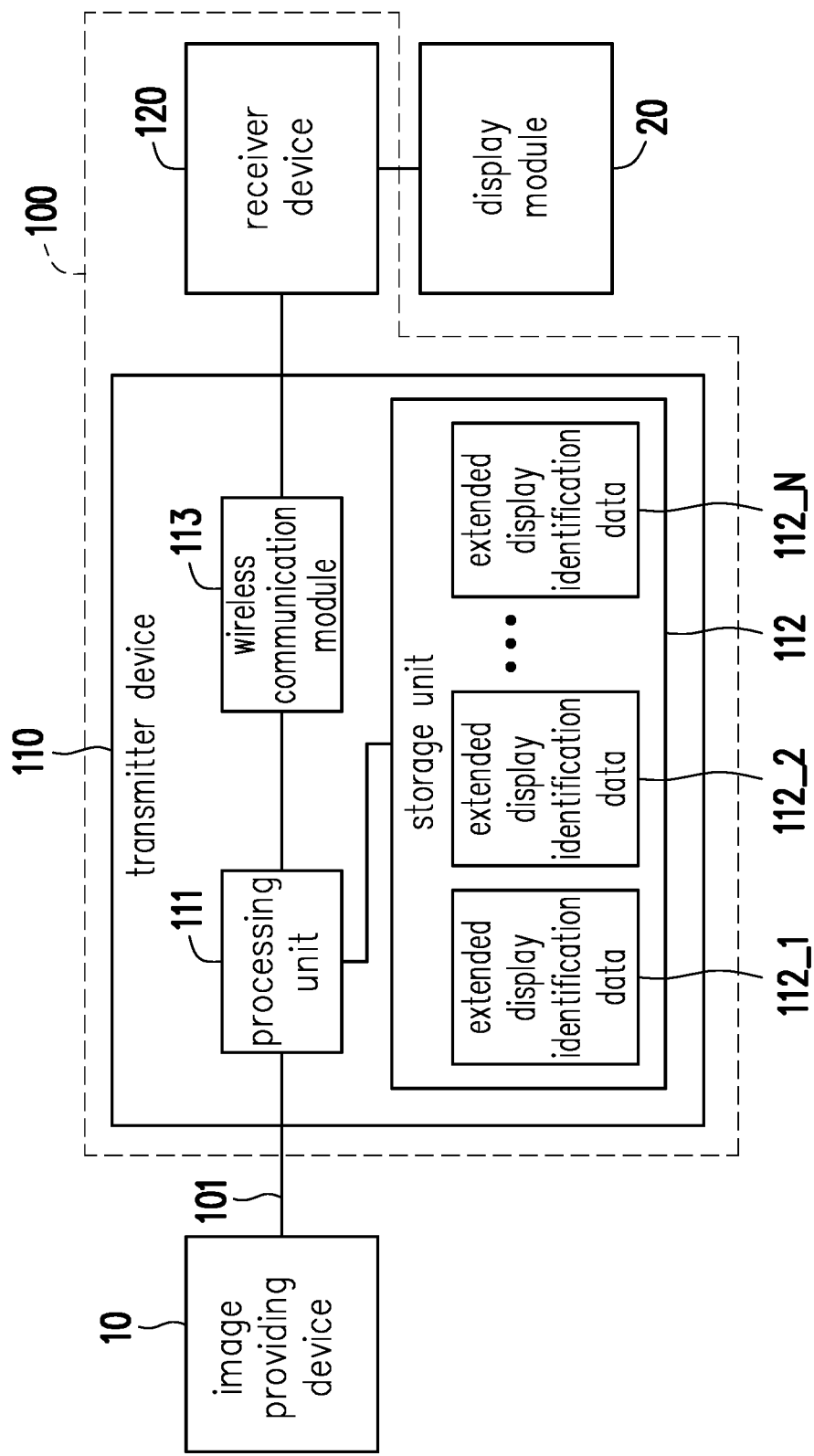
FIG. 1 is a schematic circuit diagram of a video streaming transmission system according to an embodiment of the disclosure.

In order to for the content of the disclosure to be more comprehensible, the following embodiments are taken as examples by which the disclosure may indeed be implemented. In addition, wherever possible, elements/components/steps with the same reference numerals in the drawings and embodiments represent the same or similar parts.

FIG. 1 is a schematic circuit diagram of a video streaming transmission system according to an embodiment of the disclosure. Referring to FIG. 1, a video streaming transmission system 100 includes a transmitter device 110 and a receiver device 120. The video streaming transmission system 100 is suitable for video streaming transmission between an image providing device 10 and a display module 20. In this embodiment, the transmitter device 110 may be coupled to the image providing device 10 through a transmission line 101, and may be coupled to the receiver device 120 in a wireless communication manner. In this embodiment, the transmitter device 110 includes a processing unit 111, a storage unit 112, and a wireless communication module 113. The processing unit 111 is coupled to the image providing device 10, the storage unit 112, and the wireless communication module 113. The wireless communication module 113 may be coupled to the receiver device 120 in the wireless communication manner. The receiver device 120 may further be coupled to the display module 20 in a wired or wireless manner. In an embodiment, a signal box may be further included between the receiver device 120 and the display module 20, so as to transmit an image signal through the signal box.

In this embodiment, the image providing device 10 may be, for example, computer equipment, such as a laptop, a desktop, or a tablet, which is equipped with a central processing unit (CPU) and/or a graphics processing unit (GPU). The image providing device 10 has a capability of supporting multi-screen output. In this embodiment, the display module 20 may be, for example, a single display, a single projector, or a tiling display formed by a plurality of displays or a plurality of projectors.

In this embodiment, the processing unit 111 may include, for example, a central processing unit (CPU), other programmable general-purpose or special-purpose microprocessors, a digital signal processor (DSP), a programmable controller, an application specific integrated circuit (ASIC), a programmable logic device (PLD), other similar processing devices, or a combination of these devices. In this embodiment, the storage unit 112 may be, for example, a dynamic random access memory (DRAM), a flash memory, or a non-volatile random access memory (NVRAM), etc. In addition, the receiver device 120 may also include the processing unit, the storage unit, and the wireless communication module, and may exchange extended display identification data with the display module 20. In this embodiment, the wireless communication module 113 may be, for example, a WiFi module or a Bluetooth module, but the disclosure is not limited thereto.

In this embodiment, the processing unit 111 may generate (create) a plurality of virtual extended display identification data (EDID) 112_1 to 112_N, and store the virtual extended display identification data 112_1 to 112_N in the storage unit 112, where N is a positive integer. The processing unit 111 may provide the virtual extended display identification data 112_1 to 112_N to the image providing device 10 through the transmission line 101. The image providing device 10 may automatically recognize a plurality of virtual displays coupled thereto according to the received virtual extended display identification data 112_1 to 112_N, and may output a plurality of video streams through the transmission line 101. In this embodiment, the virtual extended display identification data 112_1 to 112_N may be the same setting data or different setting data.

In other words, the transmitter device 110 may be coupled to the image providing device 10 through the transmission line 101, and provide the virtual extended display identification data 112_1 to 112_N to the image providing device 10 through the transmission line 101, so that the image providing device 10 is considered to be coupled to the displays (but are actually coupled to the single transmitter device through the transmission line). In this way, no matter the display module 20 coupled to the receiver device 120 is one or more displays, the image providing device 10 may selectively output one or more video streams corresponding to one or more extended frames (which may also include a main frame) to the transmitter device 110 by a user according to different display requirements, and then to the transmitter device 110 provides the one or more video streams to the receiver device 120.

In this embodiment, the receiver device 120 may decode the one or more video streams to generate one or more image signals, and perform image segmentation and/or image scaling operations on the one or more image signals and then output the one or more image signals to the display module 20. Therefore, the video streaming transmission system 100 in this embodiment may enable the image providing device 10 to provide the video streams, and may enable the display module 20 to display a display effect of a plurality of divided frames according to the video streams.

Figure 2:
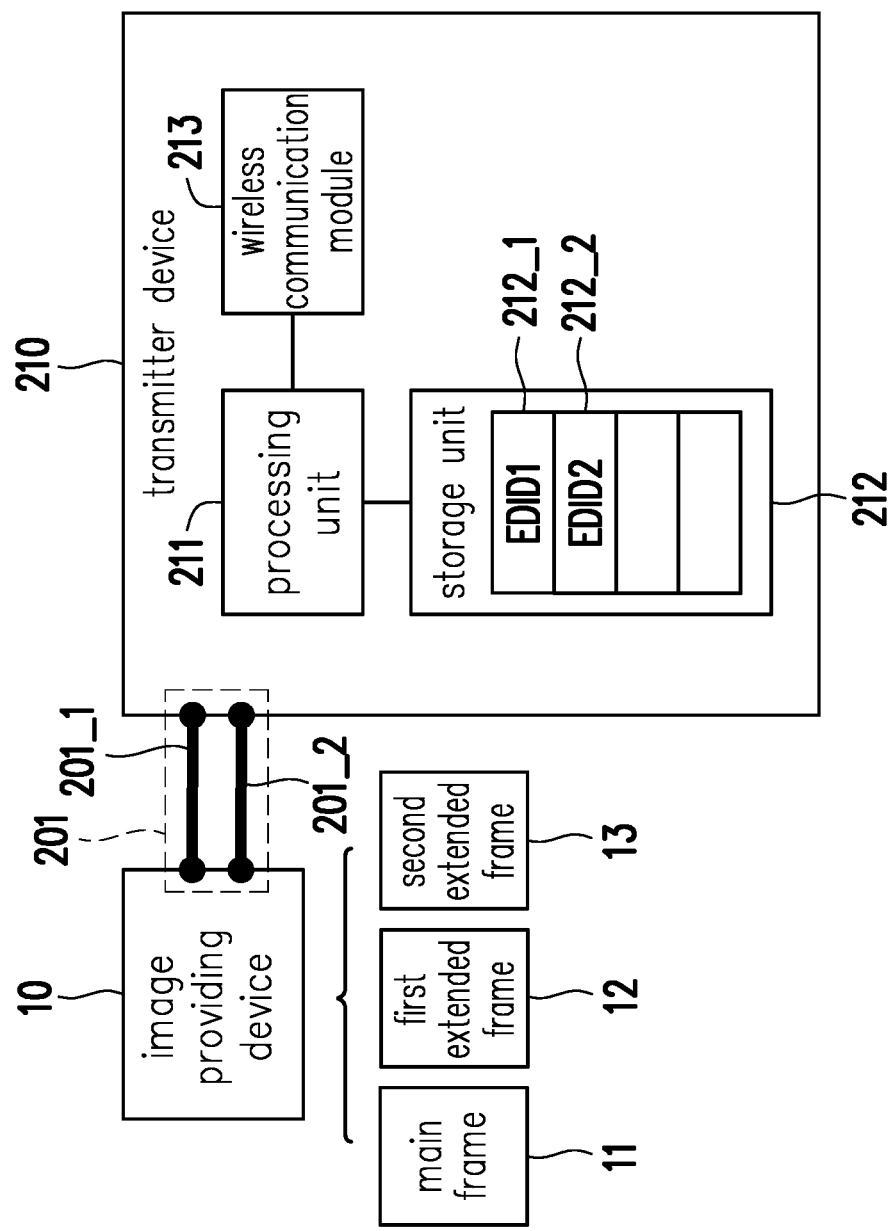
FIGS. 2 and 3 are schematic diagrams of operations of a transmitter device and an image providing device according to an embodiment of the disclosure.
Figure 3:
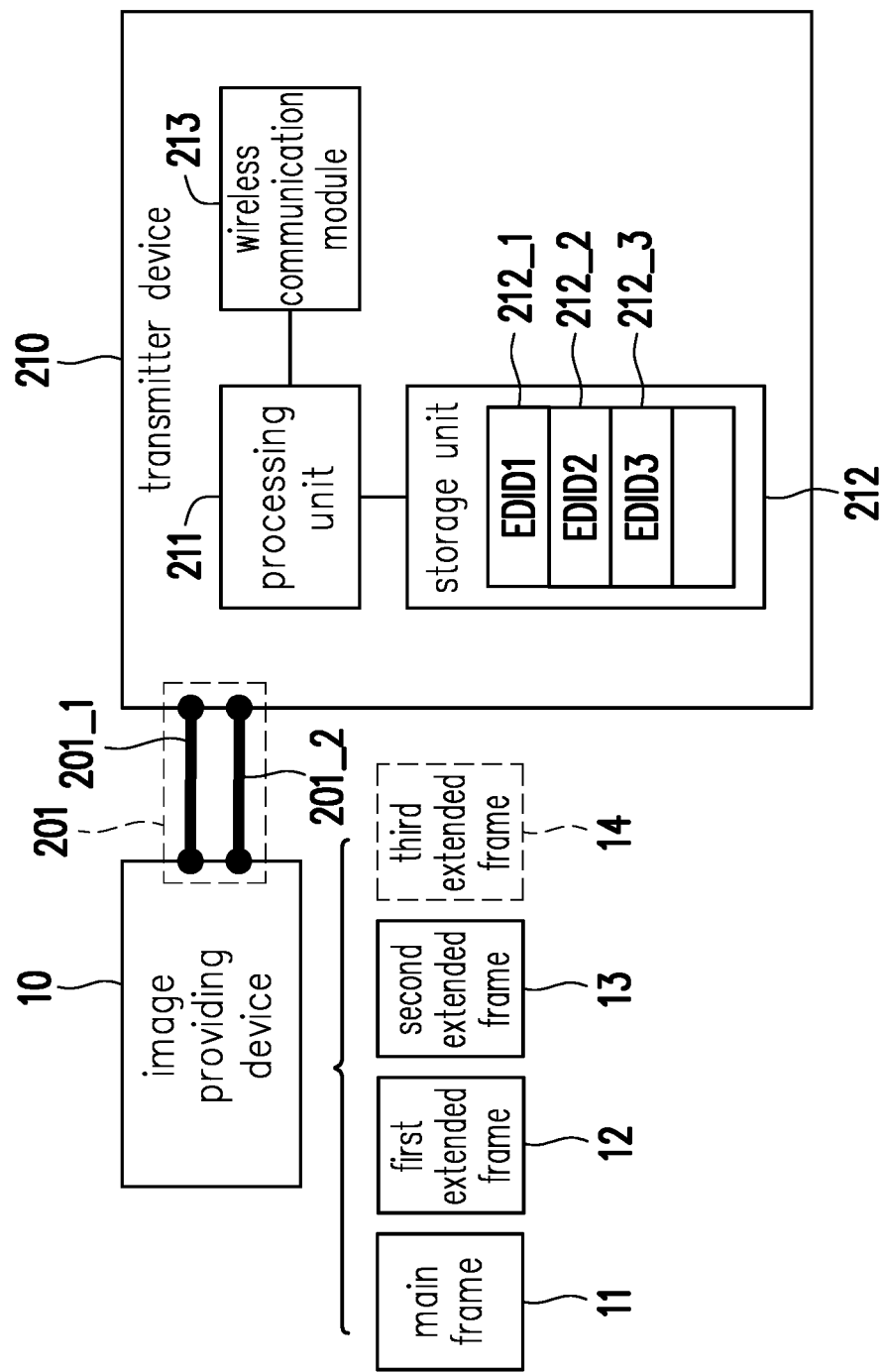

FIGS. 2 and 3 are schematic diagrams of operations of a transmitter device and an image providing device according to an embodiment of the disclosure. Referring to FIG. 2 first, a transmitter device 210 includes a processing unit 211, a storage unit 212, and a wireless communication module 213. The transmitter device 210 is coupled to the image providing device 10 through a transmission line 201. In this embodiment, the transmission line 201 may be a single transmission line, and may be a DP (DisplayPort) transmission line or a Type-C transmission line. In this embodiment, the transmission line 201 may include a data channel 201_1 and a video streaming channel 201_2. In this embodiment, reference may be made to the description of the above embodiment in FIG. 1 for related technical features of the transmitter device 210 and the image providing device 10, which will not be repeated in the following embodiments.

In this embodiment, a fixed number of N virtual extended display identification data may be pre-stored in the storage unit 212. The processing unit 211 may provide the N virtual extended display identification data to the image providing device 10 through the transmission line 201 at the same time, so that the image providing device 10 may recognize the N virtual displays coupled thereto. For example, the image providing device 10 may display a main frame 11, and it is assumed that the transmitter device 210 pre-stores a first virtual extended display identification data 212_1 and a second virtual extended display identification data 212_2 in the storage unit 212. When the transmitter device 210 is coupled to the image providing device 10 through the transmission line 201, the processing unit 211 may provide the first virtual extended display identification data 212_1 (EDID1) to the image providing device 10 through the data channel 201_1 of the transmission line 201, so that the image providing device 10 recognizes a first virtual display coupled thereto according to the first virtual extended display identification data 212_1 (EDID1). Next, when the image providing device 10 chooses to output a first video stream of a first extended frame 12 to the transmitter device 210 through the video streaming channel 201_2 of the transmission line 201, the processing unit 211 may continuously provide the second virtual extended display identification data 212_2 (EDID2) to the image providing device 10 through the data channel 201_1 of the transmission line 201, so that the image providing device 10 may recognize a second virtual display newly coupled thereto according to the second virtual extended display identification data 212_2 (EDID2). In this way, the user may operate the image providing device 10 to choose to use the second virtual extended display identification data 212_2 (EDID2), so as to output a second video stream of a second extended frame 13 to the transmitter device 210 according to the second virtual extended display identification data 212_2 (EDID2). The transmitter device 210 may output the first video stream and the second video stream to the receiver device through the wireless communication module 213, and then the receiver device provides a corresponding first image signal and second image signal to the display module for a display function of the extended frames.

In addition, in an embodiment, the image providing device 10 may also output a video stream of the main frame 11 to the transmitter device 210 according to the first virtual extended display identification data 212_1 (EDID1) or the second virtual extended display identification data 212_2 (EDID2). The transmitter device 210 may further provide the video stream of the main frame 11 to the receiver device and the display module, so that the display module may display a divided frame corresponding to the main frame.

Next, referring to FIG. 3, the number of virtual extended display identification data pre-stored in the storage unit 212 may also be dynamically increased. For example, continuing the usage example in FIG. 2, when the user operates the image providing device 10 to choose to use the second virtual extended display identification data 212_2 (EDID2) to output the second video stream of the second extended frame 13, the image providing device 10 may output the second video stream of the second extended frame 13 to the transmitter device 210 through the video streaming channel 201_2 of the transmission line 201. In addition, the processing unit 211 may automatically generate (create) a third virtual extended display identification data 212_3 (EDID3), and provide the third virtual extended display identification data 212_3 (EDID3) to the image providing device 10 through the data channel 201_1 of the transmission line 201, so as to notify the image providing device 10 to recognize a third virtual display newly coupled thereto. In this way, the user may operate the image providing device 10 to choose to use the third virtual extended display identification data 212_3 (EDID3), and the image providing device 10 may output a third video stream of a third extended frame 14 to the transmitter device 210 through the video streaming channel 201_2 of the transmission line 201. In addition, the user may also not choose, so as to retain (not use or have not yet chosen an object for frame output) the third virtual extended display identification data 212_3 (EDID3).

In other words, when the processing unit 211 determines that the virtual extended display identification data stored in the storage unit 212 have all been read and used (used by the image providing device 10 to generate the corresponding video streams), the processing unit 211 may automatically generate at least one new virtual extended display identification data and store the at least one new virtual extended display identification data in the storage unit 212. In addition, the processing unit 211 may provide the at least one new virtual extended display identification data to the image providing device 10 through the data channel 201_1 of the transmission line 201 to notify the image providing device 10 to be newly coupled to at least one virtual display. In this way, the user may operate the image providing device 10 to choose whether to dynamically add a new extended frame.

Figure 4:
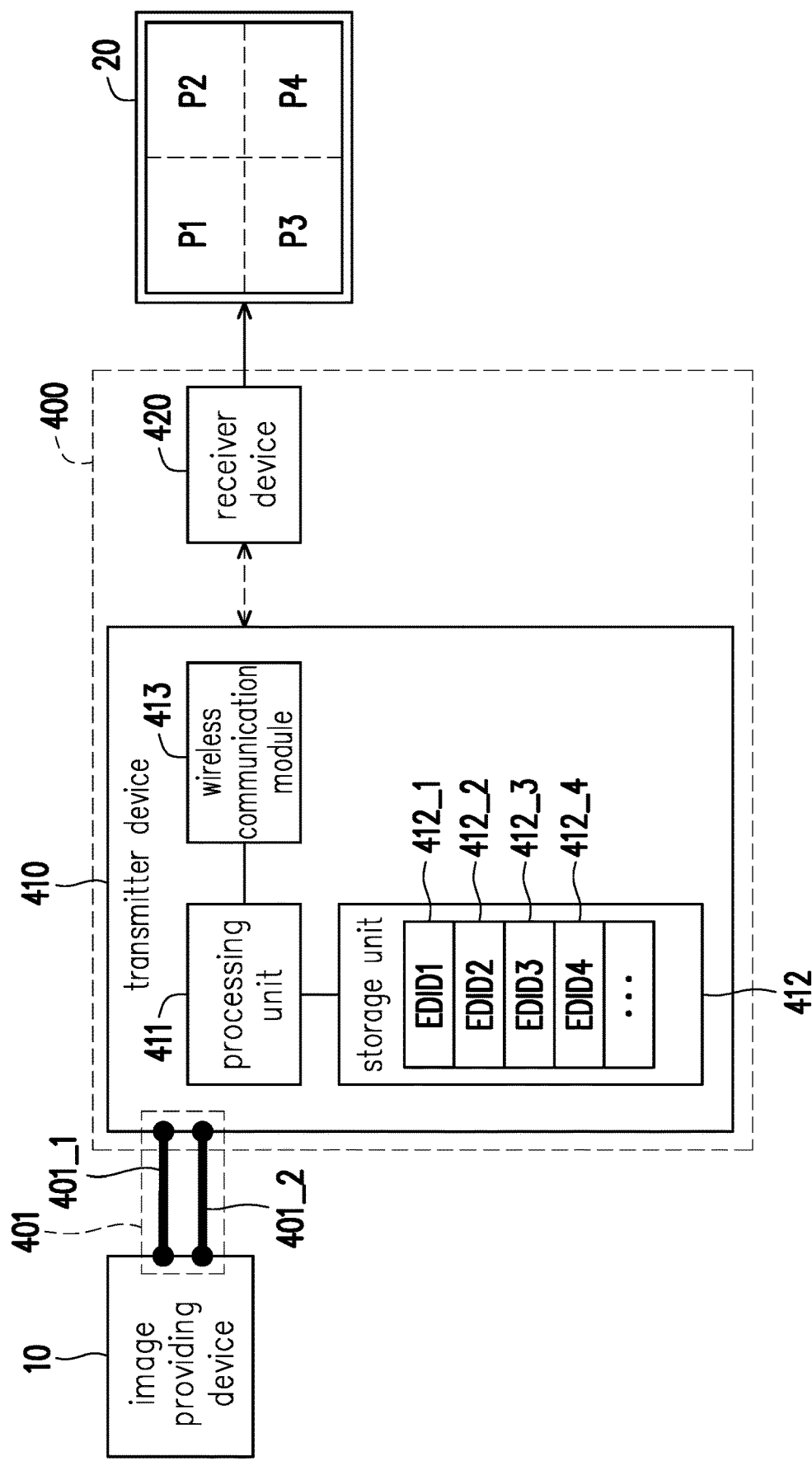
FIG. 4 is a schematic diagram of an operation of a video streaming transmission system according to an embodiment of the disclosure.

FIG. 4 is a schematic diagram of an operation of a video streaming transmission system according to an embodiment of the disclosure. Referring to FIG. 4, a video streaming transmission system 400 includes a transmitter device 410 and a receiver device 420. The transmitter device 410 includes a processing unit 411, a storage unit 412, and a wireless communication module 413. The processing unit 411 is coupled to the storage unit 412 and the wireless communication module 413. The transmitter device 410 is coupled to the image providing device 10 through a transmission line 401, and is coupled to the receiver device 420 through the wireless communication module 413 in the wireless communication manner. The receiver device 420 may be coupled to the display module 20 in the wired or wireless manner. The transmission line 401 may include a data channel 401_1 and a video streaming channel 401_2. In this embodiment, reference may be made to the descriptions of the above embodiments in FIGS. 1 to 3 for related technical features of the video streaming transmission system 400, the transmission line 401, the image providing device 10, and the display module 20, which will not be repeated in the following embodiments.

In this embodiment, the transmitter device 410 may passively provide the virtual extended display identification data to the image providing device 10. The receiver device 420 may notify the processing unit 411 of the transmitter device 410 to provide the N virtual extended display identification data to the image providing device 10 through the data channel 401_1 of the transmission line 401 at the same time according to the number of frames (e.g., N) to be displayed by the display module 20, so that image providing device 10 may recognize the N virtual displays coupled thereto. In addition, in an embodiment, the transmitter device 410 may further include a human machine interface. The user may operate the human machine interface of the transmitter device 410 according to the display requirements. The processing unit 411 of the transmitter device 410 may decide to provide the N virtual extended display identification data to the image providing device 10 through the transmission line 401 at the same time according to an operational command received by the human machine interface.

In another embodiment, the processing unit 411 may further determine the number of virtual extended display identification data provided to the image providing device 10 according to the number of divided frames of the display module 20. As shown in FIG. 4, when the display module 20 is about to display the display effect of four divided frames P1 to P4, the receiver device 420 may notify the processing unit 411 of the transmitter device 410, so that the processing unit 411 provides virtual extended display identification data 412_1 to 412_4 stored in the storage unit 412 to the image providing device 10 through the data channel 401_1 of the transmission line 401.

In this embodiment, when the image providing device 10 obtains the virtual extended display identification data 412_1 to 412_4, the image providing device 10 may recognize the four virtual displays coupled thereto according to the virtual extended display identification data 412_1 to 412_4. The image providing device 10 may output four video streams corresponding to the virtual extended display identification data 412_1 to 412_4 to the transmitter device 410 through the video streaming channel 401_2 of the transmission line 401 according to the operation by the user or automatically. In addition, the transmitter device 410 may then further provide the four video streams to the receiver device 420 through the wireless communication module 413.

In this embodiment, the transmitter device 410 may further include the human machine interface. The processing unit 411 of the transmitter device 410 may selectively provide at least one of the four video streams to the receiver device 420 through the wireless communication module 413 according to the operational command received by the human machine interface. It should be noted that the processing unit 411 may perform image synthesis on the video streams received from the image providing device 10 to synthesize the divided frames, and output a synthesized video stream to the receiver device 420 to effectively reduce data transmission quantity. For example, it is assumed that an image resolution of the display module 20 is 1080×1920, and image resolutions of the image signals of the four video streams are also 1080×1920 respectively. The processing unit 411 may perform image processing on the image signals of the four video streams to generate the four image signals respectively corresponding to the divided frames P1 to P4 with an image resolution of 270×480 (which is a reduced resolution), perform the image synthesis to generate a new video stream with an image resolution of 1080×1920 (=270× 480×4), and provide the new video stream to the receiver device 420. In this way, the data transmission quantity of images between the transmitter device 410 and the receiver device 420 may be effectively reduced.

In addition, in an embodiment, the transmitter device 410 may first provide the four video streams to the receiver device 420 through the wireless communication module 413. Next, the receiver device 420 may choose at least one of the four video streams to output to the display module 20. In this regard, the receiver device 420 may perform the image segmentation and/or image scaling operations on the four image signals of the four video streams. Furthermore, in another embodiment, the receiver device 420 may selectively receive at least one of the four video streams from the transmitter device 410. In this regard, the receiver device 420 may also include, for example, the human machine interface. The user may operate the human machine interface of the receiver device 420 according to different display requirements. The receiver device 420 may choose the image signal of at least one of the four video streams to output to the display module 20 according to the operational command received by the human machine interface. In addition, the receiver device 420 may selectively receive at least one of the four video streams from the transmitter device 410 according to the operational command received by the human machine interface.

It should be noted that the human machine interface of the transmitter device 410 or the receiver device 420 mentioned in the above embodiments may be implemented by, for example, a touch display interface, a mechanical key, or a communication interface for receiving remote operational commands or control signals, and the disclosure is not limited thereto.

Figure 5:
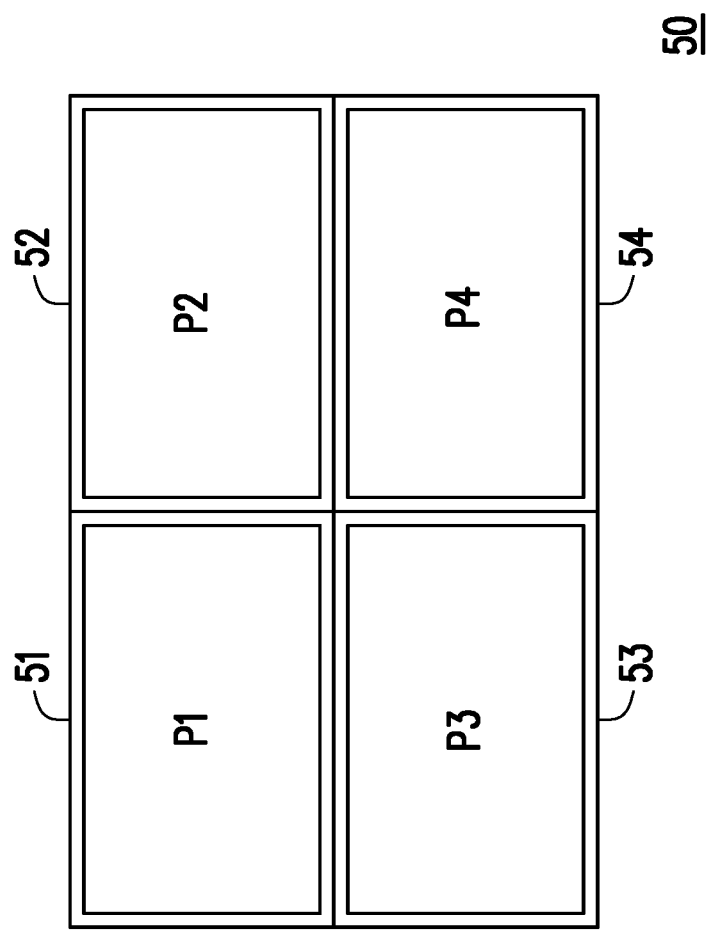
FIG. 5 is a schematic diagram of a display module according to an embodiment of the disclosure.

FIG. 5 is a schematic diagram of a display module according to an embodiment of the disclosure. Referring to FIG. 5, a display module 50 formed by tiling the displays as shown in FIG. 5 may be also implemented by the display module according to each of the embodiments of the disclosure. In this embodiment, the display module 50 may be, for example, a tiling display formed by first to fourth displays 51 to 54 to respectively display the corresponding divided frames P1 to P4. In addition, the divided frames P1 to P4 may also be tiled and projected by the projectors. Taking the video streaming transmission system 400 in FIG. 4 as an example, referring to FIGS. 4 and 5, the receiver device 420 may be coupled to the first to fourth displays 51 to 54 of the display module 50 in the wired or wireless manner. The image providing device 10 may provide first to fourth video streams to the receiver device 420 through the transmitter device 410 according to the corresponding virtual extended display identification data 412_1 to 412_4. The receiver device 420 may respectively provide the first to fourth video streams to the first to fourth displays 51 to 54, so that the first to fourth displays 51 to 54 may respectively display the divided frames P1 to P4.

Figure 6:
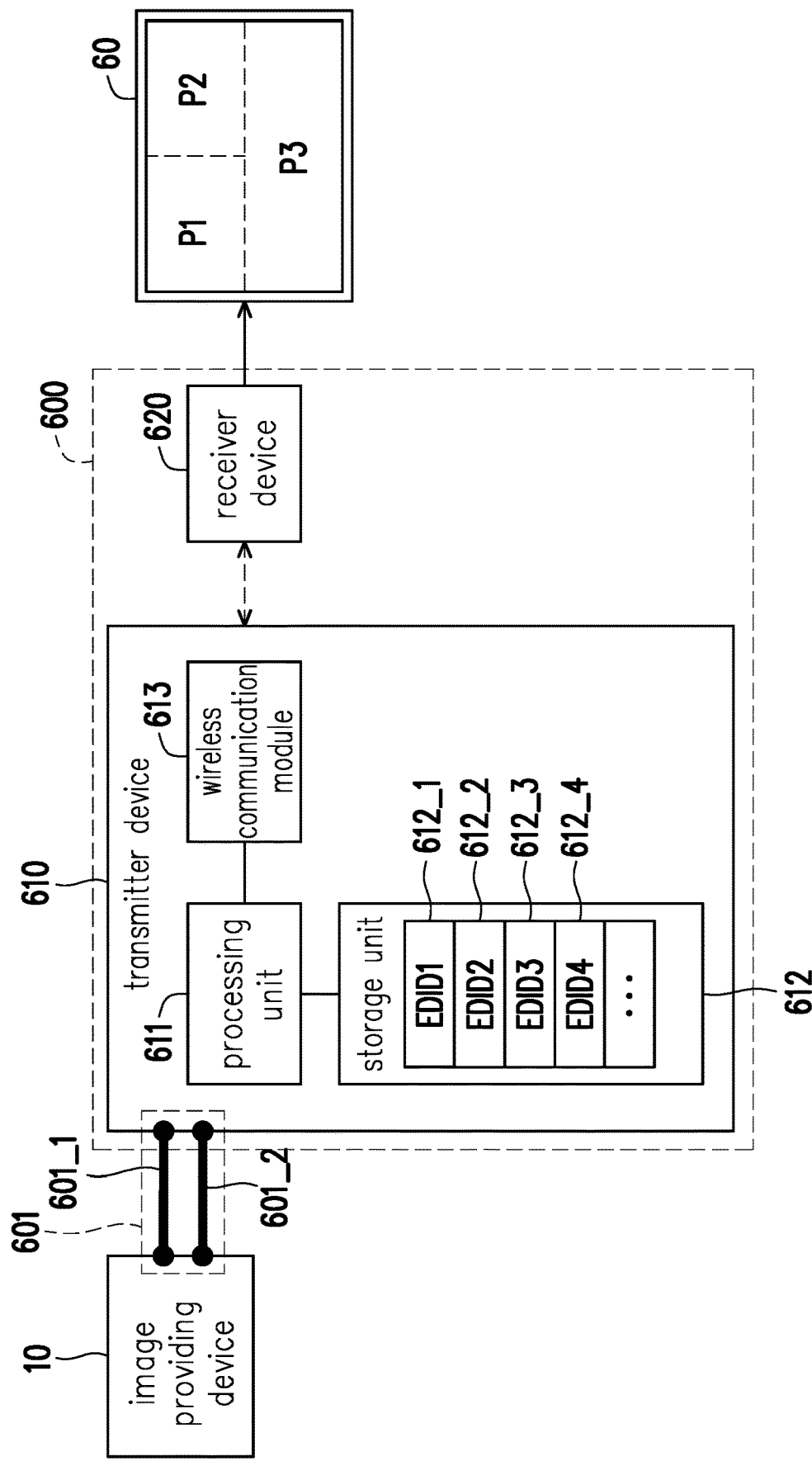
FIG. 6 is a schematic diagram of an operation of a video streaming transmission system according to another embodiment of the disclosure.

FIG. 6 is a schematic diagram of an operation of a video streaming transmission system according to another embodiment of the disclosure. Referring to FIG. 6, a video streaming transmission system 600 includes a transmitter device 610 and a receiver device 620. The transmitter device 610 includes a processing unit 611, a storage unit 612, and a wireless communication module 613. The processing unit 611 is coupled to the storage unit 612 and the wireless communication module 613. The transmitter device 610 is coupled to the image providing device 10 through a transmission line 601, and is coupled to the receiver device 620 through the wireless communication module 613 in the wireless communication manner. The receiver device 620 may be coupled to a display module 60 in the wired or wireless manner. The transmission line 601 may include a data channel 601_1 and a video streaming channel 601_2. In this embodiment, reference may be made to the descriptions of the above embodiments in FIGS. 1 to 5 for related technical features of the video streaming transmission system 600, the transmission line 601, the image providing device 10, and the display module 60, which will not be repeated in the following embodiments.

Compared to the embodiment in FIG. 4, frames to be displayed by the display module 60 in this embodiment are three divided frames P1 to P3. In this regard, in this embodiment, an image resolution of the divided frame P3 is different from image resolutions of the divided frames P1 and P2. Therefore, the processing unit 611 of the transmitter device 610 in this embodiment may provide the video streams and the corresponding virtual extended display identification data to the receiver device 620 through the wireless communication module 613. In this way, the receiver device 620 may perform the image segmentation and/or image scaling operations on the one or more image signals according to the virtual extended display identification data, and then output the one or more image signals to the display module 60. In addition, the receiver device 620 may provide the video streams and the corresponding virtual extended display identification data to the display module 60, so that the display module 60 may display a full frame.

For example, the display module 60 may display the divided frames P1 to P3 at the same time. The image resolutions of the divided frame P1 and the divided frame P2 may be, for example, 270×480, respectively, and the image resolution of the divided frame P3 may be, for example, 270×960. The processing unit 611 of the transmitter device 610 may provide extended display identification data 612_1 to 612_4 to the image providing device 10 through the data channel 601_1 of the transmission line 601. The image providing device 10 may output the corresponding three video streams to the transmitter device 610 according to the extended display identification data 612_1 to 612_3. The image resolutions of the image signals of the video streams may be, for example, 1080×1920, respectively. Next, the processing unit 611 of the transmitter device 610 may output the extended display identification data 612_1 to 612_3 and the corresponding three video streams to the receiver device 620 through the wireless communication module 613. Therefore, the receiver device 620 may perform the image processing (e.g., the image scaling operation) on the image signals of the three video streams according to the extended display identification data 612_1 to 612_3. The receiver device 620 may adjust the image resolution of the image signals used for the divided frame P1 and the divided frame P2 to 270×480, and adjust the image resolution of the image signal used for the divided frame P3 to 270×960. In this way, the display module 60 may display a full frame with the divided frames P1 to P3 at the same time according to the adjusted image signals of the three video streams.

Figure 7:
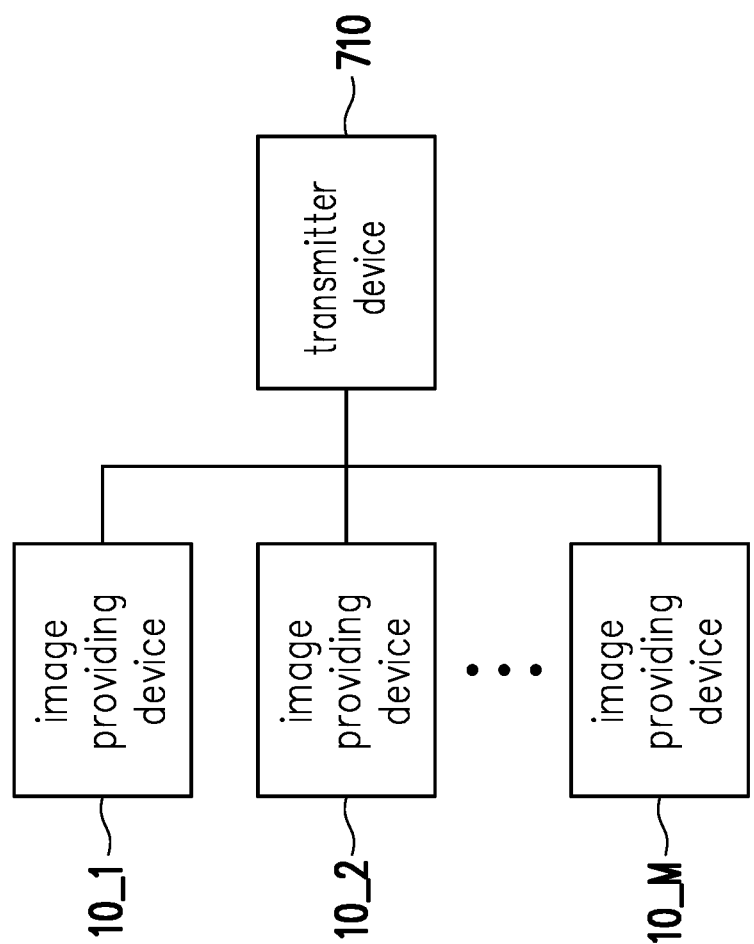
FIG. 7 is a schematic diagram of a transmitter device and multiple image providing devices according to an embodiment of the disclosure.

FIG. 7 is a schematic diagram of a transmitter device and multiple image providing devices according to an embodiment of the disclosure. Referring to FIG. 7, a transmitter device 710 in the disclosure may be further coupled to a plurality of image providing devices 10_1 to 10_M to obtain the video streams, where M is a positive integer. Specifically, the transmitter device 710 may be coupled to one of the image providing devices 10_1 to 10_M through the transmission line, and the image providing devices 10_1 to 10_M may be connected through the DP (DisplayPort) transmission line, so as to achieve video streaming transmission between the image providing devices 10_1 to 10_M. In this way, the transmitter device 710 may provide the virtual extended display identification data to the image providing devices 10_1 to 10_M, so that the image providing devices 10_1 to 10_M may respectively output the corresponding video streams to the transmitter device 710 according to the corresponding virtual extended display identification data.

Based on the above, the video streaming transmission system and the transmitter device in the disclosure may provide the virtual extended display identification data to the image providing device through the single transmitter device, so that the image providing device is considered to have the virtual displays coupled thereto. As a result, the user may selectively output the video streams of the corresponding frames (which may include the main frame and/or the one or more extended frames) to the transmitter device according to the display requirements. Therefore, the receiver device and the display module may achieve the display effect of displaying the divided frames at the same time according to the video streams provided by the single transmitter device.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A video streaming transmission system suitable for a display module and an image providing device, comprising:
   a receiver device, arranged outside the display module and the image providing device, and coupled to the display module; and
   a transmitter device, arranged outside the display module and the image providing device, and coupled to the image providing device through a transmission line and comprising:
   a processing unit;
   a storage unit, coupled to the processing unit; and
   a wireless communication module, coupled to the processing unit, and coupled to the receiver device in a wireless communication manner,
   wherein the processing unit generates a plurality of virtual extended display identification data not provided by the display module and stores the virtual extended display identification data in the storage unit, and provides the virtual extended display identification data to the image providing device through the transmission line, so that the image providing device recognizes a plurality of virtual displays coupled thereto, and outputs a plurality of video streams through the transmission line.

2. The video streaming transmission system according to claim 1, wherein when the processing unit determines that the virtual extended display identification data pre-stored in the storage unit have all been read and used, the processing unit generates at least one new virtual extended display identification data and stores the at least one new virtual extended display identification data in the storage unit, and the processing unit provides the at least one new virtual extended display identification data to the image providing device through the transmission line to notify the image providing device to be newly coupled to at least one virtual display.

3. The video streaming transmission system according to claim 2, wherein when the transmitter device is coupled to the image providing device, the processing unit provides a first virtual extended display identification data to the image providing device through the transmission line, so that the image providing device recognizes a first virtual display coupled thereto, and when the image providing device chooses to output a first video stream of a first extended frame, the processing unit continuously provides a second virtual extended display identification data to the image providing device through the transmission line, so that the image providing device recognizes a second virtual display newly coupled thereto,
   wherein when the image providing device chooses to output a second video stream of a second extended frame, the processing unit generates a third virtual extended display identification data, and provides the third virtual extended display identification data to the image providing device through the transmission line to notify the image providing device to recognize a third virtual display newly coupled thereto.

4. The video streaming transmission system according to claim 1, wherein the transmitter device is coupled to the image providing device through a single transmission line, and the single transmission line is a DP (DisplayPort) transmission line or a Type-C transmission line.

5. The video streaming transmission system according to claim 1, wherein the processing unit provides the N virtual extended display identification data to the image providing device through the transmission line at the same time, so that the image providing device recognizes the N virtual displays coupled thereto, wherein N is a positive integer.

6. The video streaming transmission system according to claim 5, wherein the receiver device notifies the processing unit to provide the N virtual extended display identification data to the image providing device through the transmission line at the same time,
   or, the transmitter device further comprises a first human machine interface, wherein the processing unit determines to provide the N virtual extended display identification data to the image providing device through the transmission line at the same time according to a first operational command received by the first human machine interface.

7. The video streaming transmission system according to claim 1, wherein the processing unit determines a number of the virtual extended display identification data provided to the image providing device according to a number of divided frames of the display module.

8. The video streaming transmission system according to claim 1, wherein the receiver device chooses at least one of the video streams to output to the display module.

9. The video streaming transmission system according to claim 1, wherein the receiver device is coupled to a first display and a second display of the display module, and the image providing device provides a first video stream and a second video stream to the receiver device through the transmitter device according to a corresponding first virtual extended display identification data and a corresponding second virtual extended display identification data, wherein the receiver device provides the first video stream to the first display, and the receiver device provides the second video stream to the second display.

10. The video streaming transmission system according to claim 1, wherein the processing unit performs image synthesis on the video streams received from the image providing device to synthesize a plurality of divided frames, and outputs a synthesized video stream to the receiver device.

11. The video streaming transmission system according to claim 1, wherein the transmitter device further comprises a first human machine interface, and the processing unit selectively provides at least one of the video streams to the receiver device through the wireless communication module according to a third operational command received by the first human machine interface.

12. The video streaming transmission system according to claim 1, wherein the receiver device comprises a second human machine interface, and the receiver device selectively receives at least one of the video streams from the transmitter device according to a fourth operational command received by the second human machine interface.

13. The video streaming transmission system according to claim 1, wherein the processing unit provides the video streams and the corresponding virtual extended display identification data to the receiver device through the wireless communication module, and the receiver device provides the video streams and the corresponding virtual extended display identification data to the display module, so that the display module displays a full frame.

14. A transmitter device, suitable for being coupled to an image providing device and a receiver device, wherein the receiver device is further coupled to a display module, the receiver device and the transmitter device are arranged outside the display module and the image providing device, and the transmitter device comprises:

a processing unit, coupled to the image providing device through a transmission line;

a storage unit, coupled to the processing unit; and a wireless communication module, coupled to the processing unit, and coupled to the receiver device in a wireless communication manner, wherein the processing unit generates a plurality of virtual extended display identification data not provided by the display module and stores the virtual extended display identification data in the storage unit, and provides the virtual extended display identification data to the image providing device through the transmission line, so that the image providing device recognizes a plurality of virtual displays coupled thereto, and outputs a plurality of video streams through the transmission line.

15. The transmitter device according claim 14, wherein when the processing unit determines that the virtual extended display identification data pre-stored in the storage unit have all been read and used, the processing unit generates at least one new virtual extended display identification data and stores the at least one new virtual extended display identification data in the storage unit, and the processing unit provides the at least one new virtual extended display identification data to the image providing device through the transmission line to notify the image providing device to be newly coupled to at least one virtual display.

16. The transmitter device according claim 15, wherein when the transmitter device is coupled to the image providing device, the processing unit provides a first virtual extended display identification data to the image providing device through the transmission line, so that the image providing device recognizes a first virtual display coupled thereto, and when the image providing device chooses to output a first video stream of a first extended frame, the processing unit continuously provides a second virtual extended display identification data to the image providing device through the transmission line, so that the image providing device recognizes a second virtual display newly coupled thereto, wherein when the image providing device chooses to output a second video stream of a second extended frame, the processing unit generates a third virtual extended display identification data, and provides the third virtual extended display identification data to the image providing device through the transmission line to notify the image providing device to recognize a third virtual display newly coupled thereto.

17. The transmitter device according claim 14, wherein the transmitter device is coupled to the image providing device through a single transmission line, and the single transmission line is a DP (DisplayPort) transmission line or a Type-C transmission line.

18. The transmitter device according claim 14, wherein the processing unit provides the N virtual extended display identification data to the image providing device through the transmission line at the same time, so that the image providing device recognizes the N virtual displays coupled thereto, wherein N is a positive integer.

19. The transmitter device according claim 14, wherein the processing unit determines a number of the virtual extended display identification data provided to the image providing device according to a number of divided frames.

20. The transmitter device according claim 14, wherein the processing unit performs image synthesis on the video streams received from the image providing device to synthesize a plurality of divided frames, and outputs a synthesized video stream to the receiver device.

* * * * *